INVENTOR.
Otto J. Adlhart

BY
ATTORNEY

United States Patent Office 3,414,439
Patented Dec. 3, 1968

3,414,439
FUEL CELL AND PROCESS OF USING WITH RUTHENIUM-TANTALUM ALLOY CATALYST
Otto J. Adlhart, Newark, N.J., assignor to Engelhard Industries, Inc., Newark, N.J., a corporation of Delaware
Continuation-in-part of application Ser. No. 314,672, Oct. 8, 1963. This application Mar. 13, 1967, Ser. No. 622,571
13 Claims. (Cl. 136—86)

ABSTRACT OF THE DISCLOSURE

This disclosure pertains to fuel cells using catalytic fuel electrodes. These electrodes assist in efficiently converting the fuel utilized into electrical energy. Certain catalysts greatly lessen then energy lost due to polarization during operation of the fuel cell.

Cross-reference to related application

This application is a continuation-in-part of Ser. No. 314,672, filed Oct. 8, 1963, now abandoned.

Background of the invention

This invention relates to fuel cells and more especially to fuel cells having new and improved fuel electrodes, the fuel electrode per se, and the production of electrical energy utilizing such fuel cell.

Fuel cells basically are composed of an oxidizer electrode, a fuel electrode and an electrolyte. The electrolyte functions to permit transport of oxygen ions or oxygen-containing ions as a directed flow from the oxidized electrode toward the fuel electrode where oxidation of the fuel takes place, with a corresponding flow of electrons in an external circuit. Organic fuels have been used heretofore as reactant at the fuel electrode. Exemplary of such fuels are oxygenated hydrocarbons, e.g., methanol.

However, the use of these organic fuels at the fuel electrode with acid or neutral electrolytes and with certain catalysts at the anode, for instance platinum alone or ruthenium alone, has resulted in a strong anodic polarization under load, i.e., during current withdrawal. In addition to the platinum alone or ruthenium alone showing an inadequate level of catalytic activity at the anode, the life of such catalysts has been comparatively short. The result is a severe reduction in the overall power output of fuel cells having such electrodes.

Summary of the invention

In accordance with the present invention, it has now been found that the strong anodic polarization occurring during current withdrawal with prior art fuel cells operating with organic fuels is materially reduced or minimized by the fuel cells of this invention having the new and improved fuel electrode. The new and improved fuel electrode of this invention comprises as catalyst an alloy of ruthenium and tantalum. Such electrode is characterized by providing a materially higher level of catalytic activity than prior art electrodes.

Brief description of the drawings

Reference is made to the accompanying drawings wherein:

Referring to FIGURE 1, fuel cell 4 comprises container 5 of "Teflon" or other material of low electrical conductivity, electrodes 6 and 7 of opposing polarity therein and respectively the fuel electrode and oxidizer electrode and liquid electrolyte 8, preferably an acid electrolyte, contacting opposed surfaces of electrodes 6 and 7. Electrodes 6 and 7, are each made up of a porous substrate or support 9 and 10 respectively, for instance a sheet of porous "Teflon" sponge. Fuel electrode 6 is gas pervious and has permeable catalyst layer 11 of the alloy of this invention of ruthenium and tantalum adhered to the support, and gas pervious oxidizer electrode 7 also has a permeable catalyst layer 12 of platinum alone adhered to the support. In addition to the catalyst being adhered to the exterior surface of supports 9 and 10 of electrodes 6 and 7, some of the catalyst is on the walls defining accessible pores of the porous supports or substrates 9 and 10. A three phase boundary of catalyst, electrolyte and gaseous fuel results in the pores of substrate 9 of fuel electrode 6, where the catalyst surface contacts the menisci of the electrolyte and the gaseous fuel. Single ply platinum gauze sheets 13 and 14 contact catalyst layers 11 and 12 respectively for collection and withdrawal of electric current. The connection to the conventional reference electrode (not shown) is designated at 26. Annular members 27 and 28 of gold and O-rings 29 and 30 of neoprene rubber serve to respectively maintain the gauze sheets 14 and 13 in contact with the catalyst layers and to seal the assembly.

Figure 1:
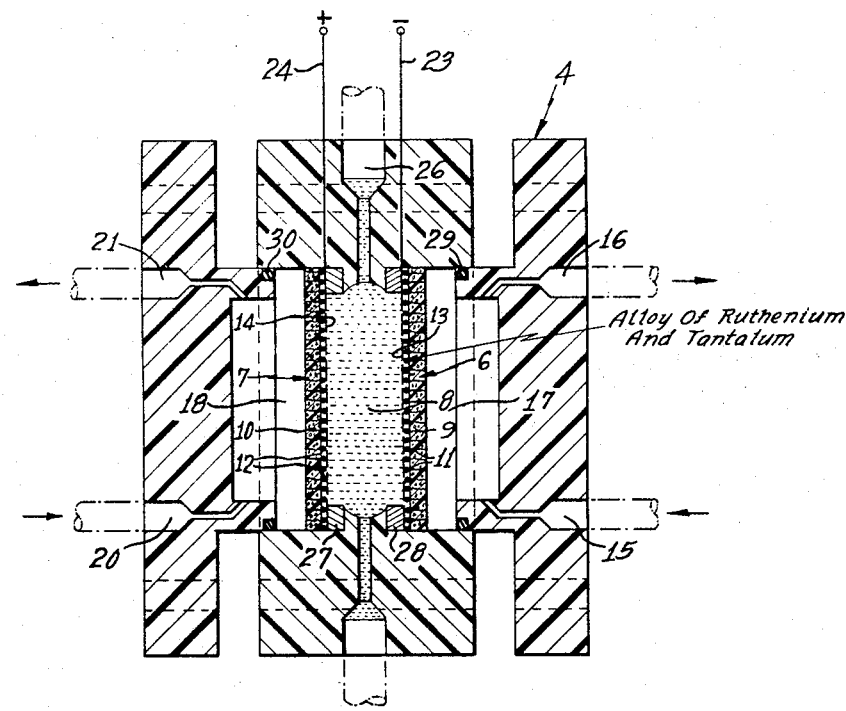
FIGURE 1 is a longitudinal section through a fuel cell of this invention.

Fuel inlet and outlet 15 and 16 respectively enable supply of the fuel in gaseous form into anode compartment 17 and the outflow of gaseous reaction products from such compartment.

The oxidizer is introduced into cathode compartment 18 through inlet 20 and the cathode effluent evolves through outlet 21. Exemplary of the oxidizer is air, oxygen-enriched air, or oxygen per se, preferably air.

Figure 2:
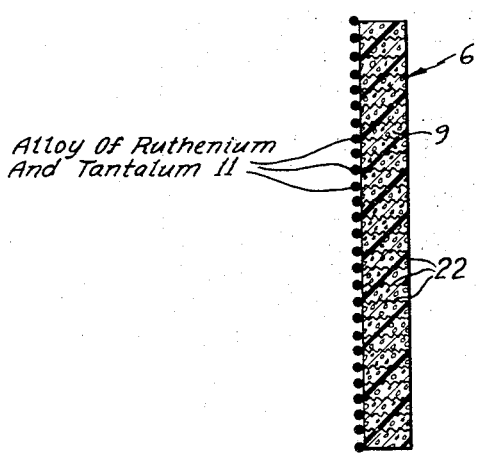
FIGURE 2 is an enlarged section through a fuel electrode of this invention.

One fuel electrode of this invention is shown in more detail in FIGURE 2. Pores 22 of porous supporting substrate 9 communicate opposite sides of support 9. The alloy catalyst of this invention is supported on substrate 9 as a gas- and liquid-permeable layer 11 of powder particles 23 with some of the catalyst particles on the walls defining the accessible pores of porous substrate 9, as previously disclosed herein. A current collecting and withdrawal member such as the platinum gauze sheet 13 shown in FIGURE 1 will contact catalyst layer 11 for the purpose stated.

Electrically conductive elements 23 and 24 are connected to the upper portion of the platinum gauze current collectors 13 and 14 respectively. Conductive elements 23 and 24 are connected in an external circuit with a suitable resistance, for instance an incandescent lamp (not shown), and the flow of current in such circuit due to the flow of electrons resulting from the electrochemical reaction within the fuel cell, results in the lamp being energized and lighting up.

Description of preferred embodiments

The combination of the ruthenium and tantalum as catalyst at the anode, i.e., fuel electrode, is important herein for the reason that such combination results in a materially higher level of catalytic activity being maintained at the anode for a considerably longer time than when a single platinum group metal, such as ruthenium alone or platinum alone is the anode catalyst. Consequently, the relatively strong anodic polarization occurring with use of the single platinum group metals is materially reduced. Further, it is essential the ruthenium and tantalum be alloyed together instead of merely a nonalloyed mechanical mixture. The reason for this is that the nonalloyed mixture of the metals result in relatively poor catalytic activity at the fuel electrode.

The catalyst of this invention can be either unsupported or supported on a suitable substrate. When unsupported, it can be in the form of a self-sustaining disc or sheet formed by compacting a mass of the alloy particles in a die by application of pressure. When supported, the alloy can be applied and adhered to the surface of metallic structures such as sheets, grids or other porous structures or nonmetallic structures such as, for instance, structures of carbon, graphite, plastics and the like. One form of such supported alloy catalyst is an intimate mixture of Ru and Ta dispersed on a high surface carrier, for example activated carbon powder. Such alloy on activated carbon powder is then adhered to a structural substrate. The surface area of the carrier is typically 50–1500 m.$^2$/g. In the case of a cell employing a quasi-solid electrolyte, such as an ion exchange membrane, the catalyst may be imbedded in the surface of such electrolyte.

The cathode, i.e, oxidizer electrode, can be a catalytic or noncatalytic electrode When a catalytic cathode is utilized, a platinum group metal, for instance platinum per se, palladium per se, or ruthenium per se can be deposited in finely divided form on the supporting substrate A noncatalytic cathode can be employed, for instance in a redox system.

The process for production of electrical energy in accordance with this invention comprises, in its broader aspects, contacting a catalytic fuel electrode of a fuel cell with a fuel, the fuel electrode comprising as catalyst an alloy of ruthenium with tantalum and being in contact with an electrolyte, and contacting an oxidizer electrode of the cell with an oxidizer, the oxidizer electrode also being in contact with the electrolyte.

The fuel, for instance a normally gaseous straight chain hydrocarbon, can be contacted in gaseous or vapor phase with the electrolyte by passage within a gas-pervious fuel electrolyte of this invention comprising the alloy of ruthenium and tantalum on the porous supporting substrate. Alternatively, the fuel can be dissolved in the electrolyte, for example methanol dissolved in sulfuric acid electrolyte, wherein it contacts the catalytic fuel electrode. The oxidizer, for instance an oxygen-containing gas, can be contacted with the electrolyte by passage within a gas-pervious oxidizer electrode. Consequently, the fuel reacts electrochemically at the fuel electrode with release of electrons which are carried off by electrically conductive means and an external circuit, and the oxidizer reacts electrochemically at the oxidizer electrode with electrons supplied from the external circuit, so that a continuous electric current results.

Throughout the specification and claims, the term "alloy" is used in the broad sense accepted by the art, e.g., the "Encyclopaedic Dictionary of Physics," Pergamon Press, 1961, as a macroscopically homogeneous mixture of metals. It will be appreciated therefore that the alloys of ruthenium and tantalum which are employed herein include intimate mixtures of the metals which may either be immiscible, or in the form of mixed crystals or solid solutions or actual chemical compounds. Furthermore, the constituents of such intimate mixtures, either as initially prepared or during operation of the fuel cells, may be partially in the oxidized form.

The ruthenium-tantalum alloy of this invention may be prepared by melting such two metals in proportions corresponding to that desired in the product alloy together with a third component, capable of being readily leached out of the resulting alloy, for instance aluminum or silicon. The melting of the three components can be done in a gas-fired or electrical furnace. The resulting alloy, after removal from the furnace and cooling solidification, is treated with caustic, for instance by immersion in potassium hydroxide or sodium hydroxide aqueous solution of, for instance, 10% caustic concentration, to leach or dissolve out the aluminum or silicon. If desired the leaching can be effected by treatment with acid. The resulting binary or substantially binary alloy, is obtained as a powder. In the last-mentioned preparation method, the aluminum or silicon is usually present in major amount, with the ruthenium and tantalum present in minor amount. Thus a typical alloy prior to the leaching contains, by weight, 85% aluminum and 15% total tantalum and ruthenium.

In one embodiment for preparing the supported alloy catalysts, the ruthenium-tantalum alloy is applied and adhered in powder form to the support. When "Teflon" is the supported substrate, the alloy powder particles are pressed into the surface of the "Teflon" at normal temperature by means of a suitable press, for instance a hydraulic press, thereby to adhere to such support. When an ion exchange membrane fabricated of, for instance, polystyrene, sulfonic acid, is the support, the alloy powder is pressed into the membrane surface to adhere to such support with the membrane surfaces maintained at an elevated temperature, suitably about 100° C.

In another embodiment for preparation of the supported alloy catalyst, the ruthenium-tantalum alloy is applied and adhered as anode catalyst to one side or face of an ion exchange membrane previously treated with electrolyte, by pressing the alloy powder particles into the surface of the membrane by means of a hydraulic press. A cathode catalyst such as one of the cathode catalysts previously disclosed herein is applied and adhered to the opposite face of the membrane electrolyte in similar manner. Alternatively, a portion of the membrane may be contacted with electrolyte, for instance by immersing such portion in a sulfuric acid electrolyte, so that the entire membrane is wetted with electrolyte. In operation water is added or removed to maintain the electrolyte concentration. With this type of catalytic anode and cathode and electrolyte, separate fuel and oxidizer supply conduits supply respectively the fuel to the anode catalyst and the oxidizer, for instance the oxygen-containing gas, to the cathode catalyst. Suitable electrically conductive members, for instance platinum gauze sheets, will contact the anode catalyst layer and cathode catalyst layer respectively for collection and withdrawal of electric current.

The fuel may be a normally gaseous, liquid or solid hydrocarbon and includes acyclic and cyclic aliphatic hydrocarbons including paraffinic, olefinic, and acetylenic hydrocarbons, naphthenes, and aromatic hydrocarbons. Exemplary of such fuels are methane, natural gas, ethane, propane, butane, pentane, hexane, a naphtha light ends $C_5$–$C_7$ fraction, a gasoline fraction, a kerosene fraction, liquefied petroleum gas, cyclobutane, cyclopropane, cyclopentane, cyclohexane, ethylene, propylene, acetylenes and benzene. The preferred fuel is a $C_1$–$C_{20}$ straight chain alkane hydrocarbon. Other fuels that may be utilized are oxygenated hydrocarbons, for instance alcohols, e.g., methanol, aldehydes, e.g., formaldehyde, organic acids, e.g., formic acid, and carbon monoxide and the above fuels and hydrogen, such as a mixture of hydrogen and carbon monoxide as in reformer gas, and hydrogen and methanol, methane or ethylene. Large organic molecules may be very favorable fuels in accordance with this invention, provided the fuel can be supplied adequately to the anode catalyst surface. Exemplary of such large organic molecules are long chain hydrocarbons, fatty acids, fatty acid esters, and sugars.

The ruthenium-tantalum alloys of this invention contain, by weight, about 10–60 percent of ruthenium and the remainder tantalum, and preferably 20–60 percent ruthenium.

The electrolyte utilized is preferably an acid electrolyte, for instance aqueous sulfuric acid solution, e.g., aqueous sulfuric acid solution of 5% to 80% by weight concentration. Other electrolytes that are satisfactory are neutral or substantially neutral electrolytes containing no free base or substantially devoid of free base, for instance sulfates, phosphates and perchlorates of alkali metals and alkaline earth metals.

The fuel cells of this invention may be operated at ambient conditions but preferably are operated at elevated temperatures in the range of about 50° C.–300° C. Sufficient heat for operation of the cells is usually provided by some polarization unavoidably occurring therein. Heat may be supplied from an outside source for start-up and, if necessary, during the course of the cell operation, for instance by steam supplied to a suitable steam jacket. The temperature of the cell may be controlled, for instance, by means of the amount of insulation material utilized, or by circulation of cooling air or other cooling gas about the cell.

The invention is further illustrated by reference to the following example. Different metals were evaluated as fuel electrode catalysts by a half cell evaluation procedure. The latter is especially convenient for rapid and unambiguous determination of differences in anode polarization, as any limitations due to cathode polarization or resistance polarization are eliminated. Such a half cell evaluation procedure is described in J. Electro chem. Soc. 109, 553 (1962). The half cell method used to evaluate the catalysts of this invention was similar except that a Ag/AgCl reference electrode was used instead of the calomel electrode.

This example is provided for the purpose of illustration and not by way of limitation.

EXAMPLE

An alloy of ruthenium and tantalum prepared as previously described herein, platinum alone, and ruthenium alone were employed as catalysts at the fuel electrode. The half cell used for testing the catalysts for fuel cell anodes was operatively connected to a cathode of platinum. The electrolyte was $2NH_2SO_4$, the fuel supplied in the form of 2 volume percent $CH_3OH$ dissolved in the $H_2SO_4$, and the cell operated at a temperature of about 90° C. The results are set forth in the table which follows:

TABLE

| Catalyst composition, weight percent | Potential in volts vs. STHE current density ma./cm.$^2$ | | | | |
|---|---|---|---|---|---|
| | 0 | 06 | 20 | 50 | 100 |
| Pt black | .16 | .37 | .44 | .49 | .55 |
| Ru 50 Ta 50 | .08 | .29 | .35 | .43 | .52 |
| Ru 30 Ta 70 | .08 | .24 | .32 | .46 | |
| Ru 11 Ta 89 | .04 | (¹) | .37 | .48 | |
| Ru 100 Ta 0 | .24 | .44 | .51 | .62 | |

¹ Reading not taken.

The superiority of the ruthenium-tantalum alloys as fuel electrode catalysts at low and high current densities over platinum alone and ruthenium alone, is shown by the data of the table. In the table "STHE" means standard hydrogen electrode.

It will be obvious to those skilled in the art that many modifications may be made within the scope of the present invention without departing from the spirit thereof, and the invention includes all such modifications.

What is claimed is:

1. A fuel cell comprising an oxidizer electrode and a catalytic fuel electrode, an electrolyte contacting a surface of each electrode, the catalyst of the fuel electrode consisting essentially of an alloy of about 10–60 weight percent ruthenium and the remainder tantalum, means for supplying an oxidizer to the oxidizer electrode, and means for supplying a fuel to the fuel electrode.

2. A fuel cell according to claim 1 wherein the fuel electrode comprises a supporting substrate having catalyst thereon.

3. A fuel cell according to claim 2 wherein the electrolyte is an acid electrolyte.

4. A fuel cell according to claim 3 wherein the fuel electrode is gas pervious.

5. A fuel cell according to claim 3 wherein the fuel electrode is an ion exchange membrane.

6. A fuel cell according to claim 3 wherein the catalyst is supported on a high surface carrier.

7. A fuel cell according to claim 6 wherein the high surface carrier is activated carbon.

8. A fuel cell according to claim 3 wherein the catalyst comprises an alloy of about 20–60 weight percent ruthenium and the remainder tantalum.

9. A process for the production of electrical energy, which comprises contacting a catalytic fuel electrode of a fuel cell with a fuel, the fuel electrode catalyst consisting essentially of an alloy of about 10–60 weight percent ruthenium and the remainder tantalum and being in contact with an electrolyte, and contacting an oxidizer electrode of the cell with an oxidizer, the oxidizer electrode also being in contact with the electrolyte.

10. A process according to claim 9 wherein the fuel is an organic fuel in gaseous phase, the electrolyte is substantially free of free base and the fuel electrode is gas-pervious.

11. A process according to claim 10 wherein the electrolyte is an acid electrolyte, and the cell is operated at a temperature of about 50°–300° C.

12. A process according to claim 9 wherein the alloy contains about 20–60 weight percent ruthenium and the remainder tantalum.

13. A process according to claim 12 wherein the electrolyte is an acid electrolyte.

References Cited

UNITED STATES PATENTS

| | | | |
|---|---|---|---|
| 2,719,797 | 10/1955 | Rosenblatt et al. | 204—290 |
| 3,134,697 | 5/1964 | Niedrach | 136—86 |
| 3,147,203 | 9/1964 | Klass | 136—86 X |
| 3,152,015 | 10/1964 | Tirrell | 136—86 |
| 3,274,031 | 9/1966 | Maget | 136—86 X |
| 3,279,950 | 10/1966 | Kordesch et al. | 136—86 |
| 3,280,014 | 10/1966 | Kordesch et al. | 136—86 X |

OTHER REFERENCES

Cohn: "Fuel Cell Materials," in Chem. Abs., volume 50, 1962, page 5752a.

Wulff et al.: "Refractory Metal Constitution Diagrams," WADD Technical Report 60–132, only pages 13–15, 19–22 relied on.

ALLEN B. CURTIS, *Primary Examiner.*